United States Patent [19]

McGovern et al.

[11] Patent Number: 4,797,268

[45] Date of Patent: Jan. 10, 1989

[54] SULFUR RECOVERY PROCESS USING METAL OXIDE ABSORBENT WITH REGENERATOR RECYCLE TO CLAUS CATALYTIC REACTOR

[75] Inventors: John J. McGovern; Paul T. Pendergraft; Min-Hsiun Lee, all of Tulsa, Okla.

[73] Assignee: Amoco Corporation, Chicago, Ill.

[21] Appl. No.: 126,815

[22] Filed: Nov. 30, 1987

[51] Int. Cl.[4] .......................................... C01B 17/04
[52] U.S. Cl. ........................... 423/574 R; 422/171; 422/190; 423/230
[58] Field of Search ................... 423/230, 574 R, 576; 502/39.52; 422/171, 190

[56] References Cited

U.S. PATENT DOCUMENTS 4,044,114  8/1977  Dezael et al. ............... 423/574 R
4,088,736  5/1978  Courty et al. ..................... 423/230
4,442,078  4/1984  Jalan et al. ............................ 502/52
4,533,529  8/1985  Lee ..................................... 423/230

FOREIGN PATENT DOCUMENTS 159730  10/1985  European Pat. Off. ........ 423/574 R

OTHER PUBLICATIONS

Norman, "Claus Sulfur Plant Operation for the Maintenance of Catalyst Activity", presented to the Gas Conditioning Conference, 3-8-1976.

Primary Examiner—Gary P. Straub
Assistant Examiner—Jeffrey Edwin Russel

[57] ABSTRACT

Regenerator effluent produced by regenerating ZnS to ZnO is provided with a stream containing $H_2S$ from the feed to a Claus plant to a catalytic oxidation zone where $O_2$ present is consumed. The effluent from the catalytic oxidation zone is provided to a Claus catalytic reaction zone.

14 Claims, 4 Drawing Sheets

SULFUR RECOVERY PROCESS USING METAL OXIDE ABSORBENT WITH REGENERATOR RECYCLE TO CLAUS CATALYTIC REACTOR

FIELD OF THE INVENTION

The invention relates to the removal of sulfur and sulfur compounds from gaseous streams containing such compounds. In one aspect, the invention relates to the removal of sulfur compounds, inclluding $H_2S$ (hydrogen sulfide) and $SO_2$ (sulfur dioxide) from Claus plant tailgas. In a further aspect, the invention relates to such removal including a step of regenerating ZnS (zinc sulfide) to ZnO (zinc oxide) in the presence of $O_2$ (oxygen).

SETTING OF THE INVENTION

A developing area of sulfur recovery technology is that of tailgas cleanup, that is, of removing trace quantities of sulfur compounds from gaseous effluent streams (tailgas) of Claus process sulfur recovery plants. Tailgas may contain substantial amounts of sulfur compounds. Tailgas from Claus or extended Claus plants (having at least one Claus low temperature adsorption reactor) typically can contain about 0.5–10% of the sulfur present in feed to the plant as elemental sulfur, $H_2S$, $SO_2$, COS (carbonyl sulfide), $CS_2$ (carbon disulfide), and the like. Tailgas cleanup processes remove at least part of such residual sulfur compounds from Claus tailgas.

While such processes can be quite effective in removing residual compounds from the Claus plant tailgas, the compounds thus removed must be disposed of. This can be accomplished by regenerating the medium used for removal of the sulfur compound and then, for example, in using ZnO absorbents, returning the regenerator effluent comprising such sulfur compounds as $SO_2$ to the Claus unit where elemental sulfur is formed by reaction with $H_2S$. See, De Zael et al., U.S. Pat. Nos. 4,044,114; Courty et al., 4,088,736; Lee et al., 4,533,529; and European patent application No. 0 159 730.

Temperature limitations during regeneration of ZnS to ZnO, however, mean that a large volume of diluent gas must be used during regeneration to avoid damage to the absorbent due to heat rise during regeneration if oxygen is present in excessive amounts. If the resulting large volume of regeneration effluent gas is returned to the Claus unit, the Claus unit must be sized for handling that volume of gas. Thus, a major factor in reducing the cost of the overall plant using ZnO absorbers is reducing the volume of regeneration effluent gas returned to the Claus plant.

Talgas cleanup processes can be of two types, either add-on where the tailgas cleanup unit is added or retrofitted onto an existing facility or design, or grass-root facilities where the Claus plant and the tailgas cleanup facility are designed and constructed as a unit.

For add-on units, returning the regenerator effluent or recycle to the Claus plant furnace or Claus catalytic reaction zone of the Claus plant means that the existing facility must be modified to handle the additional volume flow of gas. This can in effect require reconstruction of part or all of the facility. For grass-root facilities, the initial design must take into account the volume of regeneration effluent to be returned to the Claus plant.

In Lee, U.S. Pat. No. 4,533,529 effluent from a ZnS regenerator 136 is cooled in cooler 190 and provided to blower 192 and fed to Claus plant furnace 112. If the tailgas treater were added onto an existing facility operating near design flow rate, return of the regenerator effluent to Claus plant furnace 112 would mean that furnace 112 and all downstream equipment must be increased in size to allow for the increased volume flow due to the recycle stream. Further, the regenerator recycle contains relatively low concentrations of sulfur species which causes the gas in process to be diluted and reduces the efficiency of sulfur recovery in process equipment downstream of furnace 112. If the downstream equipment includes a low temperature Claus catalytic adsorber (that is, operated under conditions including temperature effective for depositing formed elemental sulfur on catalyst) as well as high temperature (that is, operated above the sulfur dew point) Claus catalytic reactors, the volume flow of the regenerator recycle stream will be reduced, but will require increasing the size of the furnace and downstream equipment if metal oxide absorber tailgas treaters are to be added to a plant operating at design flow rate.

Also, if the regenerator effluent were injected into the first zone of a conventional two zone Claus furnace, it may quench the flame or make the flame unstable due to too low a temperature in the furnace. Further, the addition of the relatively dilute regenerator recycle stream would reduce conversion of $H_2S$ to elemental sulfur by the thermal Claus reaction in the Claus furnace. Such unfavorable effects are more likely to occur with low quality acid gas streams for which flame temperature is relatively low even without addition of the dilute regenerator recycle stream.

Alternatively, if the dilute regenerator recycle stream were to be introduced into the second zone of such a two-zone furnace, then the cooled temperature and relatively short residence time in the second zone (especially in a plant to which ZnO absorbers have been retrofitted) may allow oxygen to pass through the furnace during a portion of the ZnO absorber/ZnS regenerator cycle. During the final portion of the regeneration period, the amount of $SO_2$ in the recycle stream decreases and the amount of elemental oxygen increases. The combustion of oxygen in the second zone of the furnace may or may not be complete and breakthrough of the oxygen from the furnace will have deleterious effects on Claus catalyst in downstream catalytic reactors.

The presence of oxygen at even ppm (parts per million) levels can have significantly deleterious effects on Claus bauxite and alumina catalyst, thus, W. S. Norman states as follows:

Sulfation in excess of the normally minimal equilibrium amount can cause severe catalyst deactivation by tying-up a considerable proportion of the active surface sites. The principal cause of such excessive sulfation is free oxygen at even ppm levels. In the presence of free oxygen, sulfate formation is increased due to the oxidation of chemisorbed $SO_2$, and/or sulfur. ("Sulfur Plant Operation for the Maintenance of Catalyst Activity," Paper Presented at Gas Conditioning Conference, Mar. 8, 1976, Norman, Okla.).

U.S. Pat. No. 4,533,529 discloses that the regenerator effluent can be returned to a catalytic conversion zone in the Claus plant and advises that operation of the plant should ensure that no free or molecular oxygen is introduced into the Claus catalytic conversion zone.

One method of operating the plant disclosed in U.S. Pat. No. 4,533,529 to ensure that no free or molecular oxygen would be introduced into a catalytic reaction zone might be to stop introducing oxygen into a ZnS regenerator before regeneration was complete and before oxygen breakthrough occurred. Such an approach would be quite effective and advantageous in preventing $O_2$ damage to Claus catalyst, but would mean that a portion of the sulfided (perhaps as much as 10-20% of the total in the regenerator) would never be regenerated and would remain as a zinc sulfide layer to scavenge oxygen and protect against oxygen breakthrough. This may require a larger absorber/regenerator vessel with more absorbent than if all of the absorbent were regenerated. Such operation may also require instrumentation to determine the extent of absorbent regeneration which has occurred and a relatively complex control system to regulate the feed of oxygen to the regenerator. For example, the reaction front or zone of active regeneration within the regenerator could be located by withdrawing sample streams of gas from within the absorbent bed and analyzing them for $SO_2$ and/or $O_2$. Thermocouples might alternatively be used within the sorbent bed to determine the location of the reaction front or zone of active regeneration within the reactor. Such a procedure is technically feasible but upsets in plant operation or instrument failure could result in $O_2$ breakthrough into the recycle stream and subsequent damage to Claus catalyst in the Claus catalytic reactor to which the regenerator effluent is being returned.

Another method of preventing $O_2$ from being returned to a Claus catalytic reaction zone might be to continually measure $O_2$ present in regenerator effluent and to add a precise quantity of fuel gas to the regenerator effluent stream so that all of the oxygen is consumed by combustion of the fuel gas. However, control systems with sufficiently fast response to avoid oxygen damage to the Claus catalyst will be required. Moreover, excess fuel must be avoided so that uncombusted hydrocarbons are not fed to the Claus catalytic reactors, since the presence of hydrocarbons heavier than methane in Claus catalytic reactors leads to coking and deactivation of Claus catalysts. Moreover, the fuel gas and/or the combustion products will increase the volume of the gas in process in the facility which must therefore be designed to handle such additional flow.

In facilities such as disclosed in European Patent Application 0 159 730, one might consider returning the regenerator effluent to the lower temperature Claus catalytic reaction zone. However, the European Patent teaches that the $H_2S:SO_2$ ratio entering such low temperature Claus catalytic zones should be at least 3:1 and preferably 4:1 (p. 4, lines 29-31). Hence, returning $SO_2$ to the low temperature Claus catalytic reaction zone would be contrary to the desired method of operation disclosed in the European Patent. Since the regenerator effluent comprises mostly $SO_2$ (see p. 6, lines 29-31), to produce the desired ratios of $H_2S$ to $SO_2$ would require operating the upstream Claus reactors off-ratio leading to a need for larger downstream absorbers, regenerators, and the like which is clearly not desirable. Moreover, Claus catalyst is quite susceptible to activity loss in the presence of elemental $O_2$, and moreover, it is particularly susceptible to such damage at temperatures such as are characteristic of low temperature Claus adsorptive operation. Moreover, the presence of $O_2$ in the Claus catalytic reactor will lead to a temperature rise which, particularly in low temperature adsorptive Claus catalytic reactors, will reduce recovery, leading to increased loading in the ZnO absorbers, decreased cycle time, or alternatively to larger reactors and other disadvantages. For all of these reasons, returning the regeneration effluent to the Claus low temperature catalytic reaction zone would heretofore have been considered disadvantageous.

Nevertheless, if it were feasible to return the regenerator effluent which can contain from time to time not only $SO_2$ but also $O_2$ to the low temperature Claus catalytic reaction zone, this would mean that a tailgas unit of the type comprising at least one reactor operated under conditions for low temperature Claus adsorptive removal of sulfur and a bed of zinc oxide absorbent could be added without any significant modification of the existing facility. In addition, it would also be possible in certain cases to modify a Claus plant of the type already having a low temperature Claus catalytic reaction zone by adding metal oxide absorbers and means for returning regeneration effluent to such a low temperature Claus catalytic reaction zone without other significant modification of the existing facility. Since the volume of tailgas returned can range from 20 to 40% or more of the initial acid gas flow rate to the Claus plant, the resulting savings are apparent. However, such benefits have not heretofore been available to those constructing and operating sulfur recovery facilities because of the potential for oxygen damage to the Claus catalyst.

SUMMARY OF THE INVENTION

An aspect of the invention is introducing a ZnS regenerator effluent recycle stream into a Claus catalytic reaction zone. A significant advantage of the invention is reducing oxygen concentrations occurring in a regenerator recycle stream at a point where the regenerator recycle stream is introduced into a Claus catalytic reactor to a level where damage to the Claus catalyst is prevented or significantly diminished. In the absence of the invention, free or molecular oxygen will be present in the recycle stream when $O_2$ breakthrough occurs from the regenerator. Oxygen concentrations of even ppm amounts cause deactivation of Claus bauxite and alumina catalyst.

In accordance with the invention, there is provided a method and apparatus for the recovery of sulfur from an $H_2S$—containing acid gas feedstream to a Claus plant. $H_2S$ in the acid gas feed is converted to elemental sulfur and recovered in the Claus plant producing a Claus plant tailgas comprising $H_2S$ and $SO_2$. The Claus plant comprises a Claus furnace and a Claus catalytic reaction zone. In producing the Claus plant tailgas, both $H_2S$ and $SO_2$ can be converted to elemental sulfur in a Claus catalytic adsorption zone under conditions including temperature where elemental sulfur formed by the Claus reaction is deposited on Claus catalyst therein. Then, both $H_2S$ and $SO_2$ from the Claus plant tailgas are removed by reaction in the presence of ZnO in an absorber, optionally after converting substantially all sulfur species to $H_2S$, producing ZnS and absorber effluent. ZnS is regenerated to ZnO, producing regenerator effluent comprising $SO_2$ and the regenerator effluent is returned to a Claus catalytic reaction zone in the Claus plant. Prior to such return, the regenerator effluent stream is introduced together with a portion of the $H_2S$—containing acid gas feedstream to the Claus plant into an oxidation zone. The oxidation zone can be a catalytic oxidation zone comprising a catalyst effective for removing $O_2$ by oxidizing $H_2S$ to $SO_2$ in the presence of the $O_2$. Alternatively, the oxidation zone can be a noncatalytic oxidation zone. The effluent from the oxidation zone is provided to the Claus catalytic reaction zone.

A DETAILED DESCRIPTION OF THE INVENTION

Figure 1:
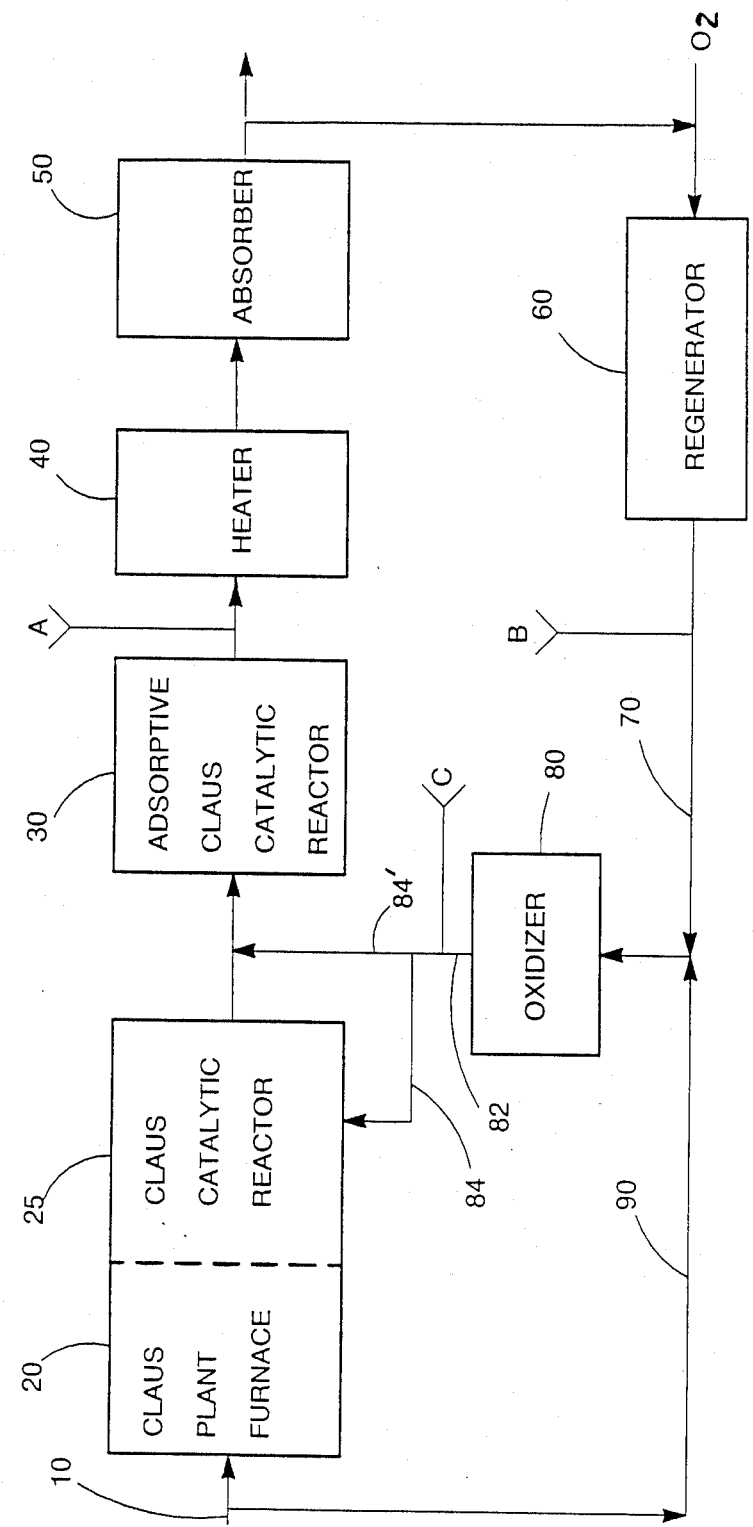
FIG. 1 illustrates schematically the invention.
Figure 2A:
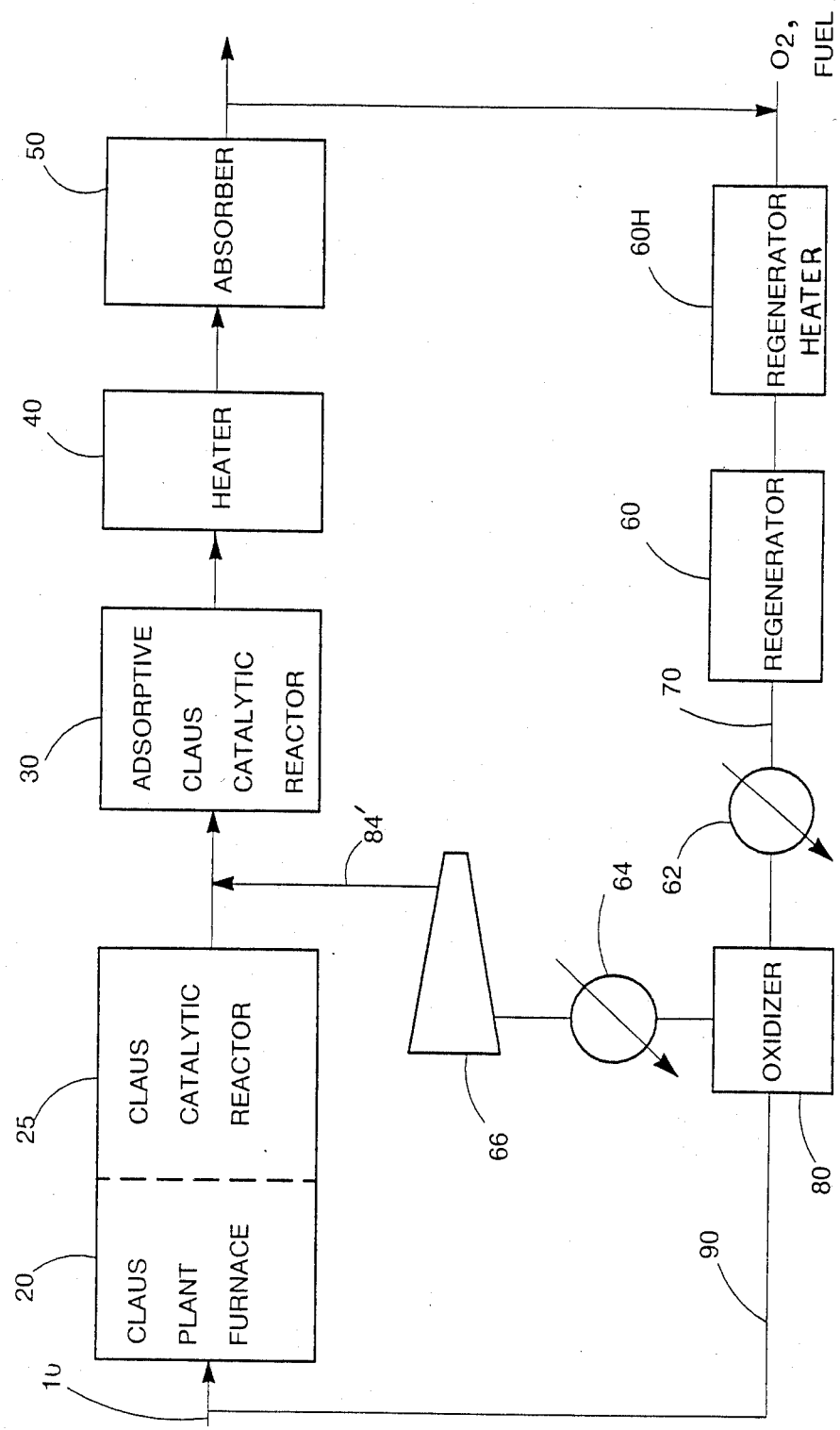
FIGS. 2A and 2B illustrate schematically first and second embodiments of the catalytic oxidation zone of the invention.
Figure 2B:
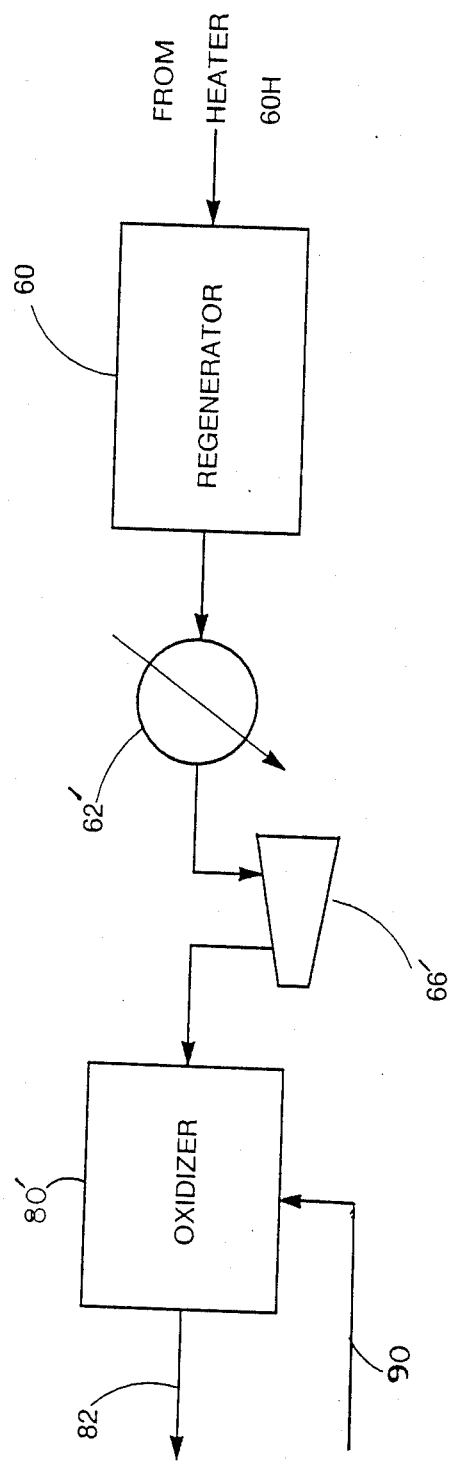

Like-numbered elements of the FIGURES are the same. The invention is illustrated in FIGS. 1, 2A, and 2B which show that a small stream 90 of acid gas, preferably a portion of the acid gas feed stream 10 normally fed to the Claus furnace 20 of the Claus plant whose tailgas is being treated (described in detail below) is provided together with regenerator 60 effluent in line 70 to an oxidation reactor 80 preferably containing suitable oxidation catalyst so that free or molecular oxygen present in the regeneration effluent stream reacts with $H_2S$ to form $SO_2$ and water. Any hydrogen ($H_2$), carbon monoxide (CO), or hydrocarbons present may also react. Such removal of the hydrocarbons can be beneficial in preventing coking of the Claus catalyst. Oxidation reactor 80 can alternatively be a vessel provided with sufficient surface area and residence time to insure removal of $O_2$ to very low levels, for example, a vessel filled with ceramic spheres, raschig rings, saddles, and the like. In such event, cooling prior to the oxidation zone should be avoided. Oxidation reactor 80 effluent is then provided by line 82 and line 84 (or 84') to a Claus catalytic reactor such as reactor 25 or low temperature (Cold Bed Adsorption, CBA) reactor 30. The oxidation reactor effluent can be cooled to an appropriate temperature known to those skilled in the sulfur recovery arts for introduction into Claus catalytic reactors 25, 30.

The acid gas in line 90 can be provided in sufficiently large quantities to completely react with the concentration of oxygen present after regeneration is completed, that is, in amounts sufficient to completely react with all of the oxygen which is being introduced into the regenerator. Preferably, the acid gas is provided in sufficiently large quantities to completely react with the concentration of oxygen used for regeneration in the regenerator 60. Such a procedure is simple to implement and ensures that oxygen is not recycled to Claus catalytic reaction zones.

For illustration, suppose that fuel gas, air, and regeneration diluent are combined in the regeneration heater (see Heater 60H in FIG. 2A and Heater 53 in FIG. 3B) to form a feed stream to the regenerator 60 containing about 2.4 mol % $O_2$ For simplicity, the presence of combustible species such as $H_2$ and CO can be neglected and all of the $O_2$ present in the regenerator feed stream can be assumed to react with ZnS to produce a regenerator effluent stream containing approximately 1.6 mol % $SO_2$. As regeneration of the ZnS in regenerator 60 approaches completion, the $SO_2$ concentration in the regenerator effluent in line 70 will decrease to zero and the $O_2$ concentration will increase from 0 to about 2.4 mol %. The quantity of acid gas $H_2S$ provided by line 90 to the oxidation reactor can be made large enough that sufficient $H_2S$ will be present to consume all of the $O_2$ present in the effluent stream at the end of regeneration. In practice, a slight excess of acid gas will be preferred. Thus, for most of the regeneration, acid gas in line 90 and regenerator effluent in line 70 will be provided to oxidation reactor 80 and recycled to the Claus plant and no reaction will be occurring in the catalytic oxidation reactor because no oxygen is present. As the oxygen concentration in the regenerator effluent increases at the end of the regeneration cycle, the oxygen will react with $H_2S$ in the catalytic oxidation reactor and be consumed.

One proposed configuration of this process is shown in FIG. 2A in which hot regenerator effluent in line 70 is cooled in cooler 62 and then provided with a stream of acid gas in line 90 to oxidation reactor 80 containing a suitable oxidation catalyst. The feed to the catalytic oxidation reactor is preferably between 350° and 700° F. Oxygen present in the stream will react with $H_2S$ primarily to form $SO_2$ and sulfur. The effluent leaving the catalytic oxidation reactor 80 can be cooled in cooler 64 (which can be a sulfur condenser) and compressed by blower 66, and fed back to a Claus catalytic reaction zone of the Claus plant by line 84'.

Since the process stream entering the catalytic oxidation reactor 80 will normally contain $H_2S$ via line 90 and $SO_2$ via line 70 varying amounts of sulfur vapor will form depending on the specific process conditions. It is therefore desirable to maintain the temperature of the regenerator effluent introduced into reactor 80 above the sulfur dew point to prevent condensation of liquid sulfur.

FIG. 2B indicates an alternative embodiment of the invention in which regenerator effluent is cooled in cooler 62', compressed by blower 66', and then introduced into oxidation reactor 80' with acid gas stream 90. This embodiment reduces the potential for condensation of liquid sulfur in the process equipment. In this case, the cooled and compressed effluent stream is reheated to a suitable temperature such that the combined acid gas and regenerator effluent streams will react in the catalytic oxidation reactor to provide essentially complete reaction of oxygen with the acid gas. This embodiment produces a potentially high temperature catalytic oxidation zone effluent. A cooler, not shown, may be required in line 82 to achieve the desired temperature of the recycle stream before it is sent to the Claus plant. A cooler will be necessary if the effluent stream from oxidation reactor 80' is provided to adsorptive Claus catalytic reactor 30.

For each mol % of $H_2S$ consumed by reaction with oxygen in the catalytic oxidation reactor 80, a temperature rise of about 284° F. will occur. Consequently, in the usual case where oxygen can be present in the range of about 0.4 up to about 3.5 mol % in the feed to the regenerator 60, it can be seen from the following equation

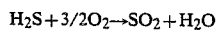

$$H_2S + 3/2 O_2 \rightarrow SO_2 + H_2O$$

that from about 0.2 to about 2.4 mol % $H_2S$ can be consumed. Care must therefore be taken to prevent excessive temperature rise from occurring in catalytic oxidation zone 80. Above about 800°–1000° F., damage to the catalyst can occur. Referring to FIG. 1, the temperature rise can be monitored in the effluent from the catalytic oxidation zone 80, for example, at point C, and if desired, the temperature decline may also be monitored in the effluent from the regenerator 60, for example, at B, as an indication that regeneration is becoming complete. Then, either the oxygen feed to the regenerator can be diminished for the remaining time of regeneration, or alternatively heat can be removed from the feed to the catalytic oxidation reactor, or from the reactor itself, and the like.

Any suitable oxidation catalyst for converting sulfur species to $SO_2$ under conditions where oxygen is limiting, can be used. The catalyst should be effective for substantially completely removing oxygen present by reaction with $H_2S$. Not all commercially available oxidation catalyst are useful under such conditions of oxygen deficiency. Suitable catalyst includes, for example, CT-769 catalyst available from Rhone-Poulenc. This catalyst is preferably used in a temperature range of about 500° to about 800° F.

Where the effluent is being provided to a high temperature Claus catalytic reactor such as reaction zone 25, the effluent from the catalytic oxidation zone can be cooled if necessary and provided to zone 25 at a temperature in the range of about 350°–550° F. Where the effluent from catalytic oxidation zone 80 is being provided to an adsorptive Claus catalytic reaction zone such as 30, the effluent from the oxidation catalytic reaction zone will be cooled to a temperature in the range of about 160°–330° F. In either case, cooling can be performed, for example, by introduction of the catalytic oxidation reactor effluent into the sulfur condenser upstream of the Claus catalytic reactor to which the stream is being provided. The $H_2S:SO_2$ ratio can be monitored at A and the plant controlled in response to that ratio to maintain the ratio at about 2:1 as is known in the art. Since point A is downstream of the point of reintroduction of lines 84 and 84', the returned $SO_2$ is automatically compensated for.

Referring again to the drawings, as shown in FIGS. 1, 2A and 2B, an $H_2S$ containing stream 10 is introduced into Claus plant 20 comprising a Claus furnace and a Claus catalytic recovery zone operated above the sulfur dewpoint. In the Claus furnace, for example, a muffle-tube furnace, a fire-tube furnace, or the like, typically about ⅓ of the $H_2S$ is converted to $SO_2$ at temperatures such as 1800°–2600° F. Claus furnace effluent can be cooled, optionally passed through a sulfur condenser to remove elemental sulfur, and fed to a Claus catalytic reaction zone 25 operated above the sulfur dewpoint (inlet temperature about 350°–650° F.). Sulfur formed by the Claus reaction $$2H_2S + SO_2 \rightarrow 3S + 2H_2O$$

in the presence of a Claus catalyst such as bauxite or alumina or titania is continuously removed as sulfur vapor and condensed and recovered by a sulfur condenser. One or more above-the-dewpoint Claus catalytic reactors and associated condensers (illustrated by zone 25) can be used as is known.

The effluent from zone 25 can be provided to Claus catalytic adsorption zone 30 where elemental sulfur formed by Claus reaction in the presence of a catalyst is predominantly deposited on the Claus catalyst therein at a temperature generally in the range of 160°–330° F. and is periodically removed from the catalyst by heating.

The operation of such Claus plants having Claus furnaces, Claus high temperature reactors, and Claus low temperature adsorptive catalytic reactors is well known in the art and need not be further described here.

The effluent from zone 30 comprising $H_2S$, $SO_2$, organic sulfides, and reducing species $H_2$ and CO can be provided to heater 40 where it is heated to about 1000° F.–1200° F. so that both $H_2S$ and $SO_2$ can be removed in zone 50 in the presence of reducing species and a zinc oxide absorbent. Alternatively, sulfur species other than $H_2S$ can be converted to $H_2S$ in a hydrogenation zone (not shown) such as is well known to those skilled in the art prior to introduction into absorber 50. Absorber 50 can then be operated at a lower temperature, for example, above 600° F.–1000° F.

The reducing species required for conversion of sulfur compounds in the tailgas to $H_2S$ can be obtained from any convenient source including that present in the tailgas as $H_2$, or available from a donor such as CO, which can react with water to yield $H_2$.

Claus plant 20, Claus catalytic reactor 25, and Claus adsorber 30 are operated so that a 2:1 ratio of $H_2S:SO_2$ is maintained at point A. As illustrated, in FIG. 1 point A is downstream of adsorptive Claus catalytic reactor 30; however, point A could also be upstream of reactor 30 so long as it is downstream of the point at which effluent from oxidizer and effluent from Claus catalytic reactor 25 are mixed. This maximizes sulfur recovery in the Claus plant and minimizes the amount of sulfur remaining in the Claus plant tailgas to be removed by the ZnO absorber 50. Such ratio can be maintained by control systems well known in the art and need not be further described here.

As used herein, the terms absorbent, ZnO, ZnO absorbent, and the like, shall mean an absorbent effective for removal of $H_2S$ and preferably for removal of both $H_2S$ and $SO_2$ in the presence of reducing species at an effective temperature. A major portion of the active absorbent, for example, 50% or more, is in the form of ZnO which is the active form. The absorbent can also contain binders, strengtheners, and support materials, for example, alumina, calcium oxide, and the like. Zinc sulfide and zinc sulfate can be used as starting materials and treated with heat and/or oxygen to produce an active absorbent. Other suitable starting materials can also be used. The ZnO absorbent is effective for absorbing $H_2S$ by undergoing sulfidization to produce a laden (sulfided) absorbent; simultaneously, if desired, hydrogenation of other sulfur compounds to $H_2S$ followed by such absorption can occur. Preferably the ZnO absorbent is capable of a high level of removal of sulfur compounds and is relatively insensitive to water.

Particularly preferred are ZnO absorbents which are thermally stable, regenerable, and capable of absorbing substantial amounts of sulfur compounds. An acceptable absorbent is United Catalysts, Inc., G72D Sulfur Removal Catalyst, available from United Catalysts, Inc., Louisville, Ky.

Representative chemical reactions occurring during absorption are shown below:

$$H_2S + ZnO \rightarrow ZnS + H_2O \tag{2}$$

$$COS + ZnO \rightarrow ZnS + CO_2 \tag{3}$$

$$CS_2 + 2ZnO \rightarrow 2ZnS + CO_2 \tag{4}$$

$$SO_2 + 3H_2 \rightarrow H_2S + 2H_2O \tag{5}$$

$$H_2S + \text{Sulfated Absorbent} \rightarrow SO_2 + ZnO\ \text{Absorbent} \tag{6}$$

While absorption is occurring in zone 50, zinc sulfide can be regenerated in regenerator 60 by introducing an oxygen containing gas, diluted for example as illustrated with effluent from zone 50 or other suitable diluent. During regeneration:

$$ZnS + 3/2 O_2 \rightarrow ZnO + SO_2 \quad (7)$$

$$\text{Absorbent} + SO_2 + O_2 \rightarrow \text{Sulfated Absorbent} \quad (8)$$

Temperature rise during regeneration can suffice if unchecked to destroy both the physical integrity and the chemical activity of the absorbent as well as to exceed metallurgical limits of preferred materials of construction. Consequently, temperature rise during regeneration is preferably controlled to less than about 1500° F.

During regeneration, a temperature rise of about 145° F. occurs for each mol % of oxygen consumed in converting ZnS back to ZnO. Preferably, from about 0.4 mol % or less to a maximum of about 3.5 mol % oxygen can be used during regeneration when the regeneration stream is introduced at about 1000° F., and to a maximum of about 2.75 mol % $O_2$ when the regeneration stream is introduced at about 1100° F.

Figure 3B:
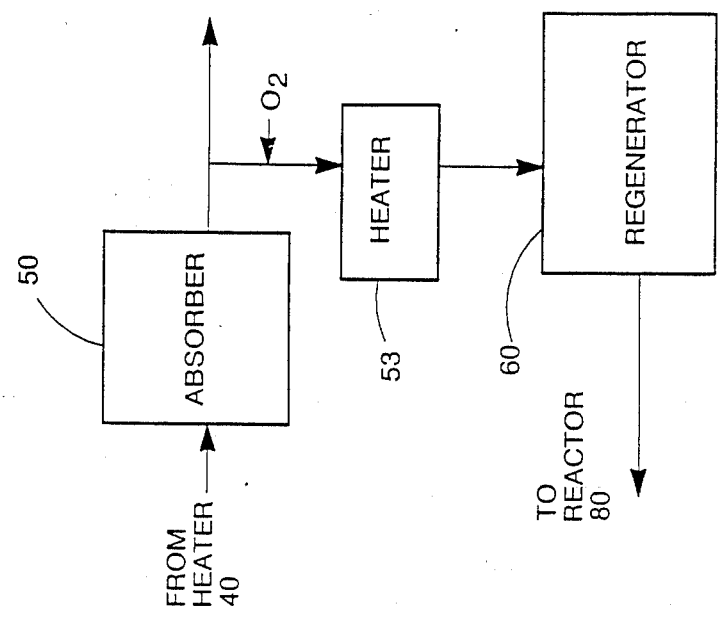
FIG. 3 illustrates schematically a further aspect of the invention wherein reducing species in absorber effluent are oxidized prior to heating for production of regenerator feed.
Figure 3A:
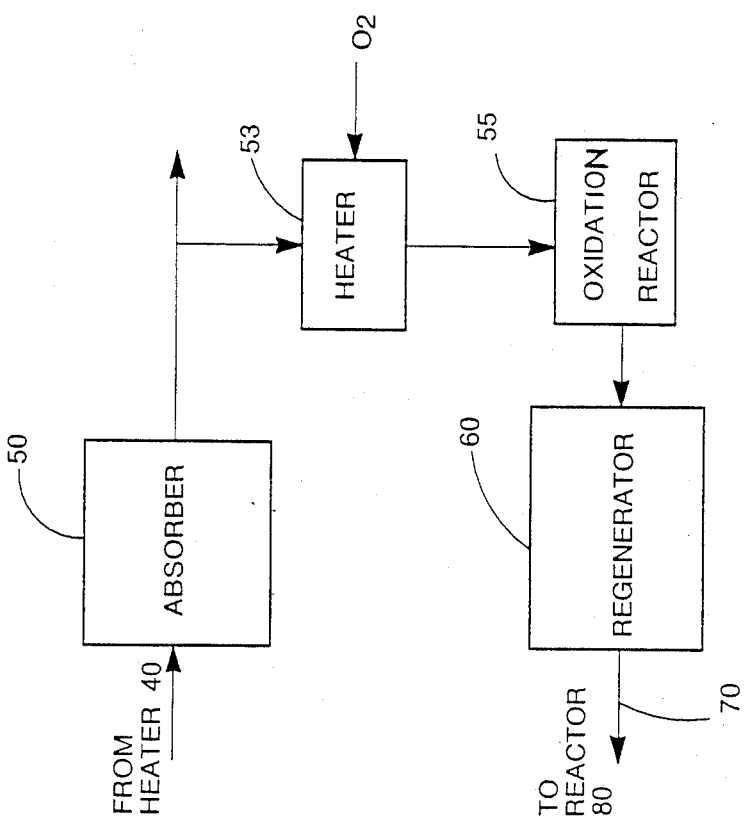

Referring now to FIG. 3, FIG. 3 illustrates methods for producing regenerator feed including methods for oxidizing $H_2$ and CO present in the portion of effluent from absorber 50 used as diluent for $O_2$ during regeneration of ZnS to ZnO in regenerator 60. By oxidizing $H_2$ and CO present before introduction into regenerator 60, (1) heat rise due to such oxidation does not occur in the regenerator 60 where the heat can limit the rate of regeneration and (2) heat rise due to oxidation of $H_2$ and CO can be used in part to heat regenerator feed being provided to regenerator 60 to an appropriate temperature. Thus, regenerator feed comprising diluent from absorber 50 and $O_2$, for example, from air, is heated in heater 53 and provided to regenerator 60. FIG. 3A shows that heater 53 effluent is provided to oxidation reactor 55 where $H_2$ and CO are combusted prior to introduction into regenerator 60. FIG. 3B shows that $O_2$ can be mixed with absorber effluent and provided to heater 53, for example, a high turbulence in-line burner. Oxidation of $H_2$ and CO can occur either in piping or in the burner provided sufficient residence time is provided with the turbulent flow or by the piping. In both 3A and 3B, combustion of $H_2$ and CO reduce heat requirements of heater 53 and permit a maximum rate of regeneration to be maintained in regenerator 60 since heat due to oxidation of $H_2$ and CO is added to the inlet temperature and is not released during regeneration in regenerator 60 due to combustion in regenerator 60.

Oxidation reactor 55 can contain a suitable catalyst for promoting oxidation of $H_2$ and CO, in the presence of an excess of oxygen. Suitable catalyst can include, for example, S099 available from Shell Chemical Company. This catalyst is preferably used in a temperature range of about 350°-700° F.

Following regeneration, sulfated absorbent can be reduced using a suitable reducing gas, for example, a portion of effluent from absorber 50 to which no oxygen has been admixed. During this reducing period, sometimes referred to as "purge":

$$\text{Sulfated Absorbent} + H_2 \rightarrow \text{Absorbent} + SO_2 + H_2O \quad (9)$$

$$\text{Sulfated Absorbent} + CO \rightarrow \text{Absorbent} + SO_2 + CO_2 \quad (10)$$

Reduction of the sulfated absorbent will occur at temperatures above about 1000° F., but preferably not much greater than about 1200° F., in the presence of $H_2$, CO, or other reducing species such as $H_2S$.

Effluent from regenerator 60 can be provided to oxidation zone 80 where $H_2S$ from the inlet to Claus furnace 20 is used to oxidize any remaining $O_2$ present in the regenerator effluent in the presence of a suitable oxidation catalyst. The oxidation reactor contains an oxidation promoting catalyst as discussed above.

A complete list of specific advantages which can result from the invention herein described depends on whether metal oxide absorbers are part of a new construction sulfur recovery plant or will be retrofitted to an existing plant, on the specific design of the Claus plant itself, and on the specific point at which the regenerator recycle stream is returned to the Claus process. The following general advantages are however indicated relating to benefits derived from the invention as compared with the circumstance where regeneration effluent is returned to the Claus plant furnace.

First, existing Claus furnaces and furnace designs can be used since modifications to the furnace to accommodate the regenerator recycle stream will be rendered unnecessary by the invention. Similarly, a smaller and/or existing waste heat boiler can be used in conjunction with the furnace.

Where the regenerator recycle stream is ultimately provided to the first Claus catalytic reaction zone typically operated above the sulfur dew point, it can be furnished at a high temperature and therefore be used to reduce and/or replace the hot bypass gas typically used to heat the feed to the first Claus catalytic reactor. This can permit greater recovery of sulfur in the first condenser of the Claus plant.

Where the regenerator recycle stream is mixed with sulfur condenser feed downstream of a first Claus catalytic reactor, then a smaller or existing unit can also be used for the first Claus catalytic reactor as well as for other equipment upstream.

Where the regenerator recycle stream is mixed with feed to the second Claus catalytic reactor, then a smaller or existing unit can also be used for the preceding sulfur condenser as well as for the other upstream equipment.

In similar fashion, if the regenerator recycle stream is mixed with a Claus process stream at any particular location, then smaller or existing Claus process equipment units can be used upstream of that location.

As a result of the fact that the regenerator recycle stream is not fed to the Claus furnace, the horsepower requirements for a regenerator recycle blower are reduced because a lower blower discharge pressure is required.

Where metal oxide absorbers are retrofitted or added on to an existing Claus plant, feeding the regenerator recycle stream to the Claus plant downstream of the acid gas furnace reduces the pressure drop for the entire plant, compared to the situation in which the recycle stream is fed to the acid gas furnace.

Where regenerator recycle is ultimately provided adding such an adsorptive Claus catalytic reaction zone and downstream equipment without significant modification of upstream equipment other than addition of a line for providing a portion of the acid gas feed to the catalytic oxidation reactor in accordance with the invention.

As compared with the circumstance where regenerator effluent is returned to a catalytic reaction zone of a Claus plant, the invention in its various aspects can provide the following advantages. First, regeneration can be allowed to continue to completion making possible the use of smaller absorber/regenerators than where regeneration is halted before completion. Second, by preventing introduction of $O_2$ into the Claus catalytic reactor, heat rise due to $O_2$ in the adsorptive Claus catalytic reaction zone will not occur and will not interfere with recovery, nor will catalyst damage occur. Consequently, by operating the Claus catalytic reaction zone at about a 2:1 $H_2S:SO_2$ ratio, size of the reactors and downstream absorbers/regenerators can be minimized.

Many other advantages and benefits will be apparent to those skilled in the art from the previous discussion. The invention however, is not limited to the specific embodiments described herein, but by the claims appended hereto.

What is claimed is:

1. Apparatus comprising:
    a Claus plant for converting $H_2S$ in an acid gas feedstream thereto to elemental sulfur by the Claus reaction and for producing a Claus plant tailgas, the Claus plant comprising a Claus furnace and a Claus catalytic reactor;
    absorption means for receiving the Claus plant tailgas and for removing both $H_2S$ and $SO_2$ in the presence of ZnO, the step of removing $SO_2$ optionally comprising converting $SO_2$ to $H_2S$ and removing such $H_2S$, producing ZnS and absorber effluent;
    regeneration means for regenerating ZnS to ZnO in the presence of $O_2$ producing regenerator effluent;
    oxidation means distinct from the Claus furnace for removing $O_2$ by oxidizing $H_2S$ to $SO_2$ in the presence of $O_2$;
    first conduit means for providing a withdrawn portion of the acid gas feedstream to the Claus plant to the catalytic oxidation means;
    second conduit means for providing regenerator effluent from the regeneration means to the catalytic oxidation means; and
    third conduit means for providing effluent from the catalytic oxidation means to the Claus catalytic reactor of the Claus plant.

2. The apparatus of claim 1 wherein:
    the oxidation means comprises a catalytic oxidation means comprising a catalyst effective for removing $O_2$ by oxidizing $H_2S$ to $SO_2$ in the presence of $O_2$.

3. The Apparatus of claim 1 wherein:
    the Claus catalytic reactor is a Claus catalytic reactor operated above the sulfur dew point wherein elemental sulfur formed by the Claus reaction is continuously removed in the vapor phase and recovered in a sulfur condenser.

4. The Apparatus of claim 1 wherein:
    The Claus catalytic reactor is a Claus catalytic adsorptive reactor in which a preponderance of elemental sulfur formed by the Claus reaction is deposited on Claus catalyst and later recovered therefrom.

5. The Apparatus of claim 1 further comprising
    fourth conduit means for providing absorber effluent from the absorption means to the regeneration means, the fourth conduit means comprising
    a heater for heating absorber effluent and $O_2$ to a temperature effective for regenerating ZnS to ZnO in the presence of $O_2$, and
    catalytic means for oxidizing reducing species comprising $H_2$ and optionally CO in the presence of $O_2$ and an effective oxidation catalyst.

6. The Apparatus of claim 1 wherein
    the Claus catalytic reactor to which effluent from the oxidation means is provided is a Claus catalytic adsorptive reactor in which a preponderance of elemental sulfur formed by the Claus reaction is deposited on Claus catalyst and later recovered therefrom; and wherein the Claus plant comprises a Claus catalytic reactor operated above the sulfur dewpoint upstream of said Claus catalytic adsorptive reactor.

7. The Apparatus of claim 1 further comprising:
    regeneration feed means for introducing an $O_2$ containing gas into the regeneration means for regenerating ZnS to ZnO; and
    wherein the first conduit means is effective for providing a withdrawn portion of the acid gas feedstream to the Claus plant to the oxidation means in amounts in excess of those required for the stoichiometric removal of $O_2$ by combustion with $H_2S$.

8. Method comprising:
    converting $H_2S$ in an acid gas feedstream to a Claus plant to elemental sulfur by the Claus reaction and producing a Claus plant tailgas in a Claus plant comprising a Claus furnace and a Claus catalytic reactor;
    removing both $H_2S$ and $SO_2$ in the presence of ZnO, optionally after converting $SO_2$ to $H_2S$, producing ZnS and absorber effluent;
    regenerating ZnS to ZnO in the presence of $O_2$ producing regenerator effluent;
    providing a portion of acid gas feedstream withdrawn upstream of the Claus furnace to oxidation means distinct from the Claus furnace for oxidizing $H_2S$ to $SO_2$ in the presence of $O_2$;
    further providing regenerator effluent to the oxidation means; and
    providing effluent from the oxidation means to the Claus catalytic reactor of the Claus plant.

9. The Method of claim 8 wherein:
    the oxidation means comprises catalytic oxidation means comprising an effective catalyst for oxidizing $H_2S$ to $SO_2$ in the presence of $O_2$.

10. The Method of claim 8 wherein:
    the Claus catalytic reactor is a Claus catalytic reactor operated above the sulfur dew point wherein elemental sulfur formed by the Claus reaction is continuously removed in the vapor phase and recovered in a sulfur condenser.

11. The Method of claim 8 wherein:
    the Claus catalytic reactor is a Claus catalytic adsorptive reactor in which a preponderance of elemental sulfur formed by the Claus reaction is deposited on Claus catalyst and recovered therefrom.

12. The Method of claim 8 comprising:
    providing absorber effluent as a diluent for regeneration by steps comprising
    heating absorber effluent and $O_2$ to a temperature effective for regenerating ZnS to ZnO in the presence of $O_2$ and
    oxidizing reducing species in the absorber effluent comprising $H_2$ and optionally CO in the presence of $O_2$ and an effective oxidation catalyst.

13. Apparatus comprising:
- a Claus plant for converting $H_2S$ in an acid gas feedstream thereto to elemental sulfur by the Claus reaction and for producing a Claus plant tailgas, the Claus plant comprising a Claus furnace and a Claus catalytic reactor;
- absorption means for receiving the Claus plant tailgas and for removing both $H_2S$ and $SO_2$ in the presence of ZnO, the step of removing $SO_2$ optionally comprising converting $SO_2$ to $H_2S$ and removing such $H_2S$, producing ZnS and absorber effluent;
- regneration means for regenerating ZnS to ZnO in the presence of $O_2$ producing regenerator effluent;
- oxidation means for removing $O_2$ by oxidizing $H_2S$ to $SO_2$ in the presence of $O_2$;
- first conduit means for providing a withdrawn portion of the acid gas feedstream to the Claus plant to the catalytic oxidation means;
- second conduit means for providing regenerator effluent from the regeneration means to the catalytic oxidation means;
- third conduit means for providing effluent from the catalytic oxidation means to the Claus catalytic reactor of the Claus plant; and
- fourth conduit means for providing absorber effluent from the absorption means to the regeneration means, the fourth conduit means comprising
  - a heater for heating absorber effluent and $O_2$ to a temperature effective for regenerating ZnS to ZnO in the presence of $O_2$, and
  - catalytic means for oxidizing reducing species comprising $H_2$ and optionally CO in the presence of $O_2$ and an effective oxidation catalyst.

14. Method comprising:
- converting $H_2S$ in an acid gas feedstream to a Claus plant to elemental sulfur by the Claus reaction and producing a Claus plant tailgas in a Claus plant comprising a Claus furnace and a Claus catalytic reactor;
- removing both $H_2S$ and $SO_2$ in the presence of ZnO, the step of removing $SO_2$ optionally comprising converting $SO_2$ and removing such $H_2S$, producing ZnS and absorber effluent;
- regerating ZnS to ZnO in the presence of $O_2$ producing regenerator effluent;
- providing a portion of acid gas feedstream withdrawn upstream of the Claus furnace to oxidation means for oxidizing $H_2S$ to $SO_2$ in the presence of $O_2$;
- further providing regenerator effluent to the oxidation means;
- providing effluent from the oxidation means to the Claus catalytic reactor of the Claus plant; and
- providing absorber effluent as a diluent for regeneration by steps comprising
  - heating absorber effluent and $O_2$ to a temperature effective for regenerating ZnS to ZnO in the presence of $O_2$ and
  - oxidizing reducing species in the absorber effluent comprising $H_2$ and optionally CO in the presence of $O_2$ and an effective oxidation catalyst.

* * * * *

UNITED STATES PATENT AND TRADEMARK OFFICE
CERTIFICATE OF CORRECTION

PATENT NO.   :  4,797,268
DATED        :  January 10, 1989
INVENTOR(S)  :  McGovern, et al.

It is certified that error appears in the above—identified patent and that said Letters Patent is hereby corrected as shown below:

Column 3, line 6 insert --absorbent-- after "sulfided".

Column 5, line 58 "$O_2$ For" should read --$O_2$. For--.

Column 7, line 5 "alternafor tively" should read --alternatively--.

Column 8, line 22 ".1C.aus" should read --Claus--.

Column 10, line 62 insert after "provided" --to a Claus catalytic adsorption zone, then existing Claus plants lacking such a zone can be readily modified to tailgas treatment in accordance with the invention by--.

Column 12, line 32 insert after ZnO, --the step of removing $SO_2$--.

Column 12, line 33 delete "after" and insert --comprising--; insert after "$H_2S$" --and removing such $H_2S$--.

Signed and Sealed this

Twenty-ninth Day of May, 1990

Attest:

HARRY F. MANBECK, JR.

Attesting Officer    Commissioner of Patents and Trademarks